United States Patent [19]

Aalbu et al.

[11] Patent Number: 4,766,552
[45] Date of Patent: Aug. 23, 1988

[54] METHOD OF CONTROLLING THE ALUMINA FEED INTO REDUCTION CELLS FOR PRODUCING ALUMINUM

[75] Inventors: Johannes Aalbu; Tom Moen; Morit S. Aalbu, all of Ovre Ardal; Peter Borg, Lillestrom, all of Norway

[73] Assignee: Ardal og Sunndal Verk a.s., Oslo, Norway

[21] Appl. No.: 929,291
[22] PCT Filed: Feb. 17, 1986
[86] PCT No.: PCT/NO86/00017
§ 371 Date: Dec. 17, 1986
§ 102(e) Date: Dec. 17, 1986
[87] PCT Pub. No.: WO86/05008
PCT Pub. Date: Aug. 28, 1986

[30] Foreign Application Priority Data

Feb. 21, 1985 [NO] Norway ................. 850700

[51] Int. Cl.$^4$ ............... G05B 17/02; G06F 15/46; C25C 3/06
[52] U.S. Cl. ............... 364/500; 204/67; 204/245; 364/149; 364/164
[58] Field of Search ............ 364/472, 500, 148-152, 364/157, 164, 165; 204/67, 245

[56] References Cited

U.S. PATENT DOCUMENTS

| | | | |
|---|---|---|---|
| 4,197,576 | 4/1980 | Sanchez | 364/164 |
| 4,245,201 | 1/1984 | Wilson et al. | 204/67 |
| 4,368,510 | 1/1983 | Anderson | 364/151 |
| 4,451,878 | 5/1984 | Shigemasa | 364/151 |

FOREIGN PATENT DOCUMENTS

| | | |
|---|---|---|
| 0097053 | 12/1983 | European Pat. Off. |
| 1437035 | 5/1976 | United Kingdom |
| 2080830 | 2/1982 | United Kingdom |
| 0128491 | 12/1984 | United Kingdom |
| 0150762 | 8/1985 | United Kingdom |

OTHER PUBLICATIONS

"Adaptive Control of Alumina Reduction Cells with Point Feeders", Peter Borg et al., Modeling, Identification and Control, 1986, vol. 7, No. 1, 45-56.

*Primary Examiner*—Joseph Ruggiero
*Attorney, Agent, or Firm*—Wenderoth, Lind & Ponack

[57] ABSTRACT

Method for controlling the alumina feed to reduction cells for the production of aluminum. There is employed an adaptive control with parameter estimation (3) and controller calculation (2) based upon the separation theorem. As a process model there is used a linear model having two inputs and one output. One input ($u_1$) is in the form of alumina feeding minus assumed alumina consumption. Another input ($u_2$) is in the form of movements of the reduction cell anode. The output (y) is in the form of the change in electric resistance across the reduction cell concerned. The model is of the first order in $u_1$ and $u_2$ whereas it is of the order zero in y. An estimated parameter ($b_1$) represents the slope of the curve for resistance as a function of alumina concentration in the electrolytic bath, and the controller (2) controls the addition of alumina to the electrolytic bath in response to the value of $b_1$.

3 Claims, 1 Drawing Sheet

METHOD OF CONTROLLING THE ALUMINA FEED INTO REDUCTION CELLS FOR PRODUCING ALUMINUM

Reduction cells with pre-baked anodes for producing aluminium have become increasingly automated during the last years. The development has passed from cells having side break and feed systems with large and infrequent addition of alumina, to cells having a center break and feed system giving a more frequent addition of alumina and smaller amounts for each addition, and then to cells having point feeders giving frequent and small additions of alumina. Close control of the alumina concentration in the electrolytic bath is important in order to obtain high current efficiency and good operational regularity of the cell. For obtaining this a good process control system is needed.

If there is a deficiency of alumina in the bath, an anode effect will occur (the voltage drop increases from appr. 4 V to 20–40 V), and if there is an excess of alumina in the bath, there will be formed sludge in the cell (undissolved alumina and bath deposits at the bottom of the cell). In order to obtain a high current efficiency there is employed a bath of low liquidus temperature. Such electrolytic baths having a low liquidus temperature are less capable of dissolving alumina and therefore it is very important to have close control of the feeding of alumina.

The process control of reduction cells for producing aluminium is a very difficult task because one has to do with a complicated interaction of many factors. In addition to the alumina concentration and the bath temperature there are, inter alia, important magnitudes such as the anode-cathode distance and the electrical resistance across the cell. Except for the resistance these magnitudes are not easily available for a more or less continuous and sufficiently accurate measurement during operation, for use in the process control. Thus, there have been proposed various control methods based upon known theories within control engineering.

The present invention is directed to all types of alumina reduction cells, including old cells in which the cell resistance is subject to external disturbances because of magnetic fields or the heat balance. This will be the case in many of the pot lines being today in operation.

During many years attempts have been made to feed alumina into reduction cells for producing aluminium with a certain degree of regularity in order to maintain the alumina content in the bath within certain limits of concentration. In Published British Patent Application No. 2080830 there is described a method for maintaining the alumina content in the bath within the range 1–3,5%. However, this known method is not so flexible and robust that it may be employed with a good result in plants being subjected to disturbances and noise. Apparently the method is intended for a specific type of cells which inherently have a higher degree of stability than present-day common alumina reduction cells.

In this known control method there is added at least one of the following additives to a bath of molten cryolite: 5 to 20% aluminium fluoride, lithium salts at a concentration equal to or smaller than 1% in terms of Li, magnesium salts at a concentration equal to or smaller than 2% in terms of Mg, and alkali metal or alkaline earth metal chloride at a concentration equal to or smaller than 3% in terms of Cl. The rate of alumina feeding is modulated depending upon the variation in the bath resistance during predetermined time intervals in alternating cycles of equal duration, for adding alumina at a slower rate and a faster rate, respectively, than what is corresponding to the consumption in the cell. This method makes it necessary to operate in the lowest part of the alumina concentration range, because it is required with the method that the bath resistance varies quickly with a change in the alumina concentration.

The above known control method takes little account of noise, such as unpredictable variations in the electric voltage, and therefore is sensitive to external disturbances.

In contrast to the above and other known control methods the present invention is directed to the control of the alumina feed to alumina reduction cells for producing aluminium, by employing adaptive control with parameter estimation and controller calculation based upon the separation theorem, and in which a linear model is utilized as the process model. The novel and specific features according to the invention are more closely defined in the claims.

By means of this invention the above deficiencies and drawbacks of known methods are substantially eliminated. The solution takes into account noise and anode movement and therefore can be used on cells having a somewhat fluctuating resistance curve. Moreover, good flexibility is obtained since the method makes it possible to operate in different alumina concentration ranges. For example it may be employed in the range adjacent the minimum of the curve for bath resistance as a function of alumina concentration, being in principle known.

The invention is particularly well adapted for use with cells having point feeders and an electrolytic bath having a low liquidus temperature, for the purpose of maintaining the alumina concentration within narrow limits.

The invention shall be explained more closely below, referring also to the drawing, in which.

Figure 1:
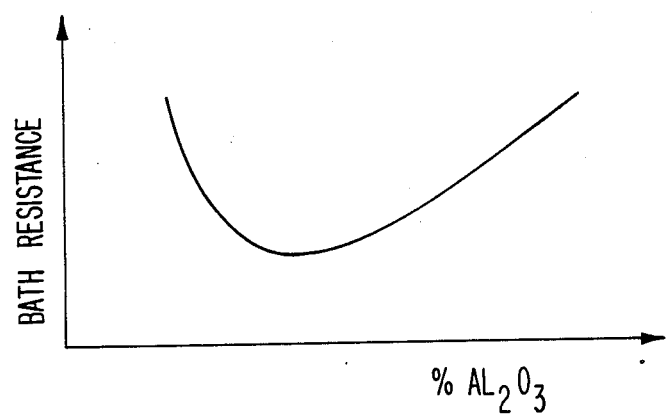
FIG. 1 shows the curve being in principle known, for electric bath resistance in a reduction cell for aluminium production, as a function of the alumina concentration in the bath.

From theory and practice it is known that the electrical resistance across the bath for aluminium electrolysis, the so-called bath resistance, is varying with the content of alumina in the electrolytic bath, broadly as illustrated in FIG. 1. The resistance curve has a minimum which may for example be located in the range 3–4% $Al_2O_3$. With decreasing alumina concentrations below this minimum the bath resistance will soon increase very strongly. For a cell during operation not only the working point will be displaced back and forth along a portion of the curve illustrated, but also the curve shape itself will actually be displaced both vertically and horizontally in the diagram. Such fluctuation or displacement may be due to various factors, of which some are in part uncontrollable. An important parameter in this connection is the slope of the resistance curve. Thus, because of the minimum mentioned, this slope will change its sign in a range of the curve which may often be of interest as a working range in the practical operation of reduction cells for aluminium production.

Whereas the alumina concentration in an electrolytic bath is not easily available for direct or continuous measurement during operation, the bath resistance on the other hand is well suited for more or less continuous and rather accurate measurements. Measurement of this bath resistance therefore is incorporated as an important step in the control of reduction cells for producing aluminium.

Figure 2:
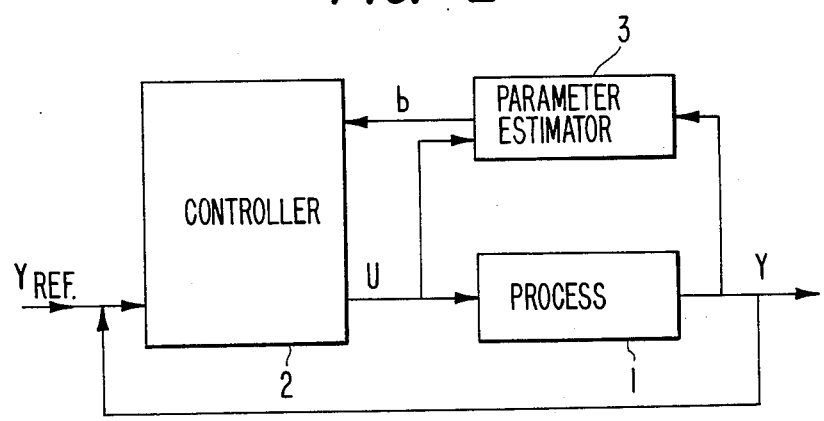
FIG. 2 shows the general structure of an adaptive control system for carrying out the method according to the invention.

FIG. 2 shows the general structure of an adaptive control system including the process to be regulated. Block 1 represents the process, i.e. in the present case a reduction cell for producing aluminium, with associated auxiliary equipment, such as feeding devices for alumina, etc. according to design practice being known per se. The controller part is represented by block 2 which may also contain parts and components being known per se, for example for the required controller calculation. This calculation takes place on the basis of parameter estimation represented by block 3. The function thereof is closely related to the principles underlying adaptive control. Thus, it appears from the figure that in addition to a conventional feedback from the process output (Y) to the input of the controller 2 for comparison with a reference value ($Y_{ref}$), signals are taken from the process output (Y) and the process input (U), respectively, for use in the parameter estimation in block 3. The estimated parameter or parameters (b) are then delivered to the controller for calculation and adjustment of the function thereof, including amplification. The content of block 2 may in general be any suitable controller algorithm using the parameter(s) from the estimator. The algorithm used in the present system will be briefly described later. The functions in block 2 as well as in block 3 may be implemented by means of digital electronic circuitry and/or completely or partly by means of a suitable computer. The technology being at disposal at a given time will to a high degree determine which electronic means are resorted to for carrying out the method according to the invention.

Thus, as will be seen from FIG. 2, the adaptive control algorithm consists of two parts, namely parameter estimation and controller calculation.

The separation of these two parts is usually according to the so-called separation theorem, which means that in the controller calculation it is taken as an assumption that the estimated parameters are the real parameters. Therefore, the controller calculation is the same as in conventional control with constant and known parameters, and various controllers may be used depending upon the case concerned.

Various techniques may also be employed for parameter estimation. The most popular method is the least squares method. The maximum likelihood method is also frequently used with a somewhat better result, but with a somewhat longer calculating time. The most commonly employed process model for a single input, single output system (SISO) is a linear model of the type:

$$A(Z^{-1})y = Z^{-d}B(Z^{-1})u + C(Z^{-1})v \quad (1)$$

in which $$A(Z^{-1}) = 1 + a_1 Z^{-1} + a_2 Z^{-2} + \ldots + a_n Z^{-n}$$

$$B(Z^{-1}) = b_1 Z^{-1} + b_2 Z^{-2} + \ldots + b_n Z^{-n}$$

$$C(Z^{-1}) = 1 + c_1 Z^{-1} + c_2 Z^{-2} + \ldots + c_n Z^{-n}$$

$Z^{-1}$ is a time shift operator, $y(k-1) = Z^{-1} y(k)$
y is a process output
u is a process input
v is noise
d is dead time
n is the order of the model
k is a time increment.

There is introduced a vector $\psi$ which contains the earlier outputs, inputs and noise and a vector $\Theta$ which contains all the parameters. The model may then be written as:

$$y(k) = \psi^T(k)\Theta(k-1) + v(k) \quad (2)$$

in which $$\psi^T(k) = [-y(k-1) \ldots -y(k-n)u(k-d-1) \ldots u(k-d-n)v(k-1) \ldots v(k-n)]$$

$$\Theta^T(k-1) = [a_1 \ldots a_n, b_1 \ldots b_n, c_1 \ldots c_n]$$

The difference between the real resistance measurement at time $k+1$ and the one calculated by the model at time k with respect to time $k+1$, is designated $e(k+1)$, that is $$e(k+1) = y(k+1) - y_{est}(k+1|k) = y(k+1) - \widetilde{\psi}^T(k+1)\widetilde{\Theta}(k) \quad (3)$$

The estimated data vector $\widetilde{\psi}$ is equal to the real data vector $\psi$, except that the unknown noise signals v are replaced by the estimate of the noise, being the previous errors e. The vector $\widetilde{\Theta}$ contains the parameter estimates. The new parameter vector is estimated in a recursive manner by using $$\widetilde{\Theta}(k+1) = \widetilde{\Theta}(k) + \gamma(k)e(k+1)$$

in which the gain vector $\gamma$ is given by $$\gamma(k) = \frac{P(k)\widetilde{\psi}(k+1)}{\lambda + \widetilde{\psi}^T(k+1)P(k)\widetilde{\psi}(k+1)} \quad (4)$$

The matrix P is proportional to the covariance matrix of the parameter estimates and is updated recursively by $$P(k+1) = \left[I - \gamma(k)\widetilde{\psi}^T(k+1)\right]P(k)\frac{1}{\lambda} \quad (5)$$

$\lambda$ is a forgetting factor.

If $\lambda$ is equal to 1, nothing will be forgotten. If $\lambda$ is smaller than 1, the algorithm forgets the past exponentially. The algorithm may also forget linearly by adding a constant diagonal matrix (R) to the P matrix.

The algorithm as described above (4) is valid for estimation by using the least squares method.

Use of the maximum likelihood method requires filtering of the data vector $\psi$. According to the invention such filtering is preferred.

As mentioned previously the control of reduction cells for the production of aluminium is difficult because of the fact that there are not many measurements which can be performed in real time (on-line). Only the resistance or more correctly the current and the voltage, are measured on-line.

In order to be able to control the alumina concentration in the bath it is necessary to have an approximate knowledge thereof at all times. Here it is not sufficient to keep an account of alumina added and consumed, since both these are uncertain and, besides, the alumina concentration may change as a result of the forming or dissolving of sludge and side freeze or additions from the alumina cover of the cell. Thus, the invention is directed to "measuring" the alumina concentration indirectly by estimating the slope (the derivative) of the resistance alumina curve in FIG. 1. For this purpose there is set up a linear model of the resistance variation as described below, in which the slope is incorporated as a parameter.

It is first assumed that the bath resistance (R) is only influenced by the $Al_2O_3$ concentration (X). The bath resistance may then be differenciated as follows:

$$\frac{dR}{dt} = \frac{dR}{dx} \cdot \frac{dx}{dt} \tag{6}$$

$dR/dx$ is the slope of the curve in FIG. 1 and
$dx/dt$ is the change in $Al_2O_3$ concentration which is due to consumption and feeding of $Al_2O_3$.

If $dR/dx$ is designated $b_1$ and $dx/dt$ is designated u, equation (6) may be expressed as:

$$R(k) - R(k-1) = Tb_1 u(k-1) \tag{7}$$

in which T=the sampling time.

If the change in resistance which is due to anode movement is taken into account, equation (7) may be expressed as:

$$R(k) - R(k-1) = b_1 u_1(k-1) + b_2 u_2(k-1) \tag{8}$$

in which $u_1 = T u$ and $b_2$ is change of resistance per mm anode movement.

If $R(k) - R(k-1) = y(k)$, and a first order noise contribution is taken into account, equation (8) may be expressed as:

$$y(k) = b_1 u_1(k-1) + b_2 u_2(k-1) + v(k) + c_1 v(k-1) \tag{9}$$

in which v(k) is an independent white noise sequence.

When comparing this model and the general model (1) it is seen that (9) is a two-input, one-output model of the first order in $u_1, u_2$ and v and of zero order in y. It follows from this that the algorithm being developed for linear models can be employed without change with a data vector and a parameter vector.

$$\psi(k) = [u_1(k-1) u_2(k-1) v(k-1)]^T$$

or $$\widetilde{\psi}(k) = [u_1(k-1) u_2(k-1) e(k-1)]^T$$

and $$\Theta(k) = [b_1 b_2 c_1]^T_k$$

The data vector is filtered according to a particular embodiment:

$$\widetilde{\phi}^T(k) = [u_1'(k-1) u_2'(k-1) e'(k-1)]$$

in which $$u_1'(k-1) = u_1(k-1) - c_1(k) u_1'(k-2)$$

$$u_2'(k-1) = u_2(k-1) - c_1(k) u_2'(k-2)$$

$$e'(k-1) = e(k-1) - c_1(k) e'(k-2)$$

The model estimates the resistance measurement at time (k) for the time (k+1)

$$y_{est}(k+1) = \widetilde{\psi}^T(k+1) \widetilde{\Theta}(k) \tag{10}$$

The estimation error is calculated by $$e(k+1) = y(k+1) - y_{est}(k+1) \tag{11}$$

in which y(k+1) is the value being actually measured at time (k+1).

The parameter vector is estimated recursively by using $$\widetilde{\Theta}(k+1) = \widetilde{\Theta}(k) + \gamma(k) e(k+1)/\Gamma \tag{12}$$

in which the gain vector is given by $$\gamma(k) = \frac{P(k)\widetilde{\psi}(k+1)}{1 + \widetilde{\psi}^T(k+1) P(k) \widetilde{\psi}(k+1)}$$

in which P is proportional to the covariance matrix of the parameter estimates and is updated recursively by $$P(k+1) = [I - \gamma(k) \widetilde{\psi}^T(k+1)] P(k) \tag{13}$$

in which I is the identity matrix.

In the above particular embodiment with filtering one puts $$\widetilde{\psi}(k+1) = \widetilde{\phi}(k+1).$$

The magnitude $\Gamma$ has been introduced in order to reduce the gain at large, separate excursions of the estimation error resulting from sudden changes in the resistance which are not caused by changes in the alumina concentration or anode regulation.

$$\Gamma = \max\left[1, \frac{|e(k+1)|}{e_{filt}(k+1)}\right]$$

in which $e_{filt}(k+1) = s e_{filt}(k) + t(1-s)|e(k)|$ s and t are suitably chosen constants.

The input signal $u_1(k)$ must be calculated from the sum of the $Al_2O_3$ additions in the time interval from (k−1) to k and the estimated $Al_2O_3$ consumption during the same interval, i.e.

$u_1(k)$ = (rate of addition − rate of consumption) T/bath volume.

When the alumina concentration in the bath varies, the estimator will adjust the value of the slope $b_1$ correspondingly. In order to obtain reliable estimates it is necessary that the process is excited to a sufficient degree. According to the invention this is attended to by having the controller vary the additions of oxide so that $b_1$ will oscillate about a working point at the curve of FIG. 1 being favourable to the process.

The parameter $b_2$ depends upon the resistivity in the bath and therefore will vary with bath composition and bath temperature.

In order to be sure that the estimator is "awake" a constant diagonal matrix R is added to the covariance matrix P in equation (5). This is not absolutely necessary, but constitutes a preferred feature according to the invention.

The advantage of doing this instead of using a simple forgetting factor λ is that a different forgetting may be associated with the various parameters. If the feeding involves large changes in the $Al_2O_3$ concentration, there will be expected a significant change of $b_1$. The element in R which corresponds to $b_1$ must be relatively large if the estimator shall be able to follow these variations. The drawback of applying a quick forgetting is that the estimator will be sensitive to noise and gives a poorer filtering of the data.

Figure 4:
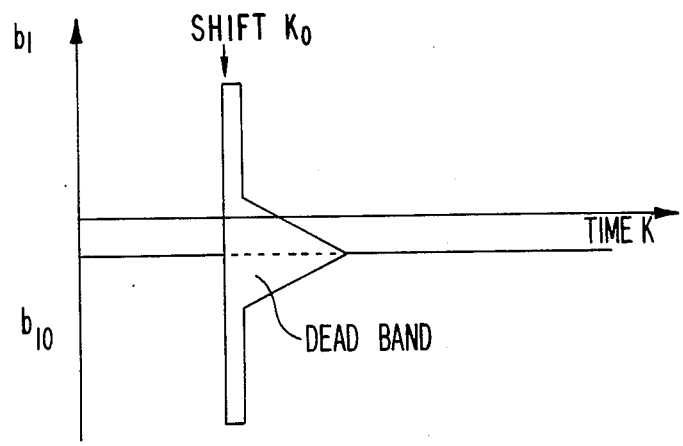
FIG. 4 shows the deadband calculation for switching between high and low feeding rate.
Figure 3:
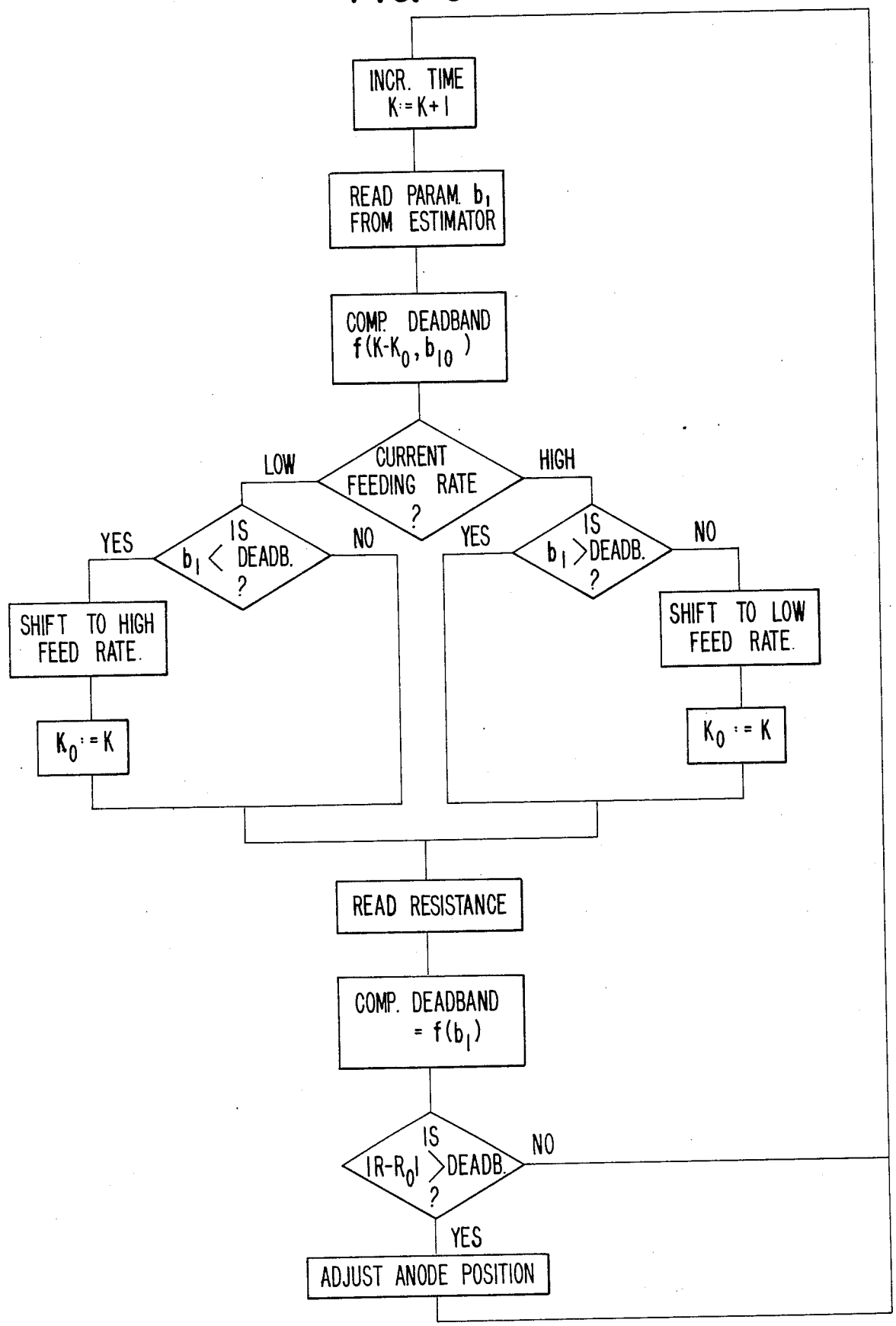
FIG. 3 shows a flowchart describing the main principles of the controller.

The parameter estimation algorithm described above will give information about the present state of the process. The parameters could therefore be used in the controller block (FIG. 2) to calculate a favourable feeding rate and anode adjustment. In the present system only the parameter $b_1$, which gives information about the alumina concentration, is used. The controller algorithm is roughly described in FIG. 3. Hence, the feeding rate alternates between a high and a low level, corresponding to over- and underfeeding of the cell. The selection of the feeding rate is based on the value of parameter $b_1$ as shown in the flowchart. A deadband is introduced to avoid a too frequent switching between the feeding levels, as shown qualitatively in FIG. 4. The $b_{10}$ in the figure corresponds to the means operating point on the curve in FIG. 1. In addition to the procedure shown in the flowchart, the controller can order other feeding rates during or after special events, such as current disconnection and anode effect.

Figure 5:
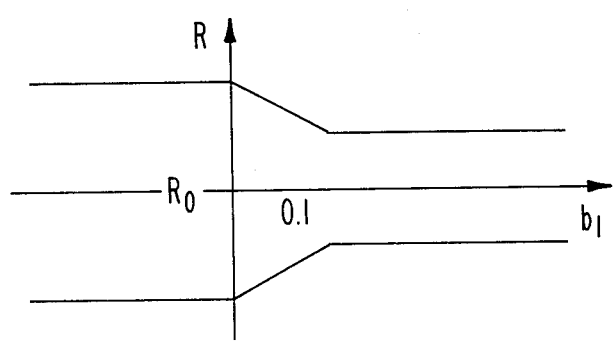
FIG. 5 shows the resistance deadband for anode control and its dependence on the parameter $b_1$.

The controller also provides for keeping the bath resistance R close to a reference value $R_0$. This function is also associated with the value of $b_1$ in order to avoid frequent anode adjustments as a result of the deliberate fluctuation of the resistance with the alumina concentration. This dependence is shown qualitatively in FIG. 5.

We claim:

1. A method of controlling the alumina feed to reduction cells for producing aluminum, comprising the steps of: using the non-linear function relationship between resistance and alumina concentration in an electrolytic bath for obtaining the value of the alumina concentration at all times; estimating the derivative of this function; and controlling the alumina supply so as to secure reliable estimates, so that the value of this derivative oscillates about a freely selected working point corresponding to an alumina concentration being favorable to the production of aluminum; wherein a linear model is applied for this estimation, said linear model being of the relationship between resistance change, alumina concentration change and a change in the anode position and in accordance with the following equation:

$$y(k) = b_1 u_1(k-1) + b_2 u_2(k-1) + v(k) + c_1 v(k-1)$$

wherein:
y(k) is an output corresponding to an electrical resistance change across the cell during a time increment k−1 to k;
$u_1$ is a first input variable corresponding to the difference between alumina added and assumed alumina consumption in said time increment in terms of concentration change;
$u_2$ is a second input variable corresponding to the movement of the anode position in said time increment;
v is a white noise sequence which drives the noise model:

$$v(k) + c_1 v(k-1),$$

k is the time increment number; and
wherein: parameter $b_1$ represents said derivative of the curve for resistance as a function of alumina concentration in the electrolytic bath; parameter $b_2$ represents resistance change per length unit movement of the anode and parameter $c_1$ is incorporated in a first order model of the noise which influences the resistance, parameters $b_1$, $b_2$ and $c_1$ being estimated recursively by relating predicted resistance change for the instant k+1 to the actually occurring resistance change, and the deviation being utilized for updating the parameter estimates in accordance with the following equations:

$$e(k+1) = y(k+1) - \widetilde{\psi}(k+1)\widetilde{\theta}(k)$$

and $$\widetilde{\theta}(k+1) = \widetilde{\theta}(k) + \gamma(k)e(k+1)/\Gamma$$

wherein
$\widetilde{\psi}(k+1)$ is the data vector $[u_1(k) u_2(k) e(k)]^T$,
$\widetilde{\theta}(k)$ is the parameter vector $[b_1 b_2 c_1]^T$ and
T designates that the vector is to be transposed,
wherein the gain vector $\gamma$ is determined in accordance with the following equation:

$$\gamma(k) = \frac{P(k)\widetilde{\psi}(k+1)}{1 + \widetilde{\psi}^T(k+1)P(k)\widetilde{\psi}(k+1)}$$

wherein P is proportional to the covariance matrix of the parameter estimate and is updated recursively by the equation:

$$P(k+1) = [I - \gamma(k)\widetilde{\psi}^T(k+1)]P(k),$$

wherein I is the identity matrix; and wherein Γ, which reduces the gain at large estimation errors caused by sudden excursions of the resistance, is determined in accordance with the equation:

$$\Gamma = \max\left[1.0, \frac{|e(k+1)|}{e_{filt}(k+1)}\right]$$

wherein $e_{filt}(k+1) = s\, e_{filt}(k) + t(1-s)|e(k)|$ and wherein s and t are preselected constants.

2. A method according to claim 1, wherein, in order to avoid the effect of random disturbances, the data vector is filtered in accordance with the following equations:

$$\overline{\phi}^T(k) = [u_1'(k-1) u_2'(k-1) e'(k-1)]$$

wherein $$u_1'(k-1) = u_1(k-1) - c_1(k)u_1'(k-2)$$

$$u_2'(k-1) = u_2(k-1) - c_1(k)u_2'(k-2)$$

$$e'(k-1) = e(k-1) - c_1(k)e'(k-2)$$

and wherein $\widetilde{\psi}(k) = \widetilde{\phi}k)$.

3. A method according to claims 1 or 2, wherein the algorithm is adapted to forget linearly by adding a constant diagonal matrix R to the P matrix in accordance with the following equation:

$$P(k+1) = P(k+1) + R.$$

* * * * *